United States Patent
Lee et al.

(10) Patent No.: US 11,363,623 B2
(45) Date of Patent: Jun. 14, 2022

(54) METHOD AND USER EQUIPMENT FOR TRANSMITTING UPLINK DATA, AND METHOD AND BASE STATION FOR RECEIVING UPLINK DATA

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 16/612,732

(22) PCT Filed: May 30, 2018

(86) PCT No.: PCT/KR2018/006141
§ 371 (c)(1),
(2) Date: Nov. 11, 2019

(87) PCT Pub. No.: WO2018/221953
PCT Pub. Date: Dec. 6, 2018

(65) Prior Publication Data
US 2020/0084791 A1    Mar. 12, 2020

Related U.S. Application Data

(60) Provisional application No. 62/512,194, filed on May 30, 2017.

(51) Int. Cl.
*H04W 72/12* (2009.01)
*H04L 1/18* (2006.01)
*H04W 72/04* (2009.01)

(52) U.S. Cl.
CPC ....... *H04W 72/1284* (2013.01); *H04L 1/1812* (2013.01); *H04W 72/042* (2013.01); *H04W 72/044* (2013.01); *H04W 72/1289* (2013.01)

(58) Field of Classification Search
CPC .............. H04L 1/1812; H04L 1/1685; H04W 72/1289; H04W 72/044; H04W 72/042; H04W 72/1284
See application file for complete search history.

(56) References Cited

U.S. PATENT DOCUMENTS

2010/0002630 A1*  1/2010  Park ................... H04W 74/006
                                                    370/328
2010/0257419 A1* 10/2010  Sung .................... H04L 1/1812
                                                    714/748

(Continued)

FOREIGN PATENT DOCUMENTS

KR    1020070105287    10/2007
KR    101548744        9/2015

OTHER PUBLICATIONS

PCT International Application No. PCT/KR2018/006141, Notification of Transmittal of The International Search Report and the Written Opinion of the International Searching Authority, or Declaration dated Sep. 14, 2018, 17 pages.

*Primary Examiner* — Syed Ali
(74) *Attorney, Agent, or Firm* — Lee Hong Degerman Kang Waimey

(57) ABSTRACT

In the present invention, a user equipment (UE) receives resource configuration information including information on a first radio resource not dedicated to the UE. The UE performs transmission of uplink data using the first radio resource. The UE transmits a request for radio resource dedicated to the UE for retransmission of the uplink data if the transmission of the uplink data using the first radio resource is not successful for a certain number of transmissions of the uplink data or for a certain period of time.

10 Claims, 9 Drawing Sheets

(56) References Cited

U.S. PATENT DOCUMENTS

| | | |
|---|---|---|
| 2012/0113942 A1 | 5/2012 | Kim |
| 2012/0147734 A1 | 6/2012 | Kim et al. |
| 2012/0176983 A1* | 7/2012 | Iwamura ........... H04W 72/1289 |
| | | 370/329 |
| 2013/0215862 A1* | 8/2013 | Suzuki ................. H04W 76/27 |
| | | 370/329 |
| 2015/0063180 A1* | 3/2015 | Chen ...................... H04L 5/001 |
| | | 370/280 |
| 2015/0181571 A1* | 6/2015 | Park ..................... H04W 76/28 |
| | | 370/252 |
| 2016/0285591 A1* | 9/2016 | Dortmund ............. H04L 1/1877 |
| 2017/0223675 A1* | 8/2017 | Dinan .................. H04W 72/042 |
| 2018/0123765 A1* | 5/2018 | Cao ....................... H04L 1/1671 |
| 2018/0145798 A1* | 5/2018 | Suzuki ................. H04L 1/1812 |
| 2019/0081743 A1* | 3/2019 | Loehr ................... H04W 52/02 |

* cited by examiner (a) Control-Plane Protocol Stack (b) User-Plane Protocol Stack (a) Control Plane Protocol Stack in NR (b) User Plane Protocol Stack in NR // METHOD AND USER EQUIPMENT FOR TRANSMITTING UPLINK DATA, AND METHOD AND BASE STATION FOR RECEIVING UPLINK DATA

CROSS-REFERENCE TO RELATED APPLICATIONS

This application is the National Stage filing under 35 U.S.C. 371 of International Application No. PCT/KR2018/006141, filed on May 30, 2018, which claims the benefit of U.S. Provisional Application No. 62/512,194, filed on May 30, 2017, the contents of which are all hereby incorporated by reference herein in their entirety.

TECHNICAL FIELD

The present invention relates to a wireless communication system, and more particularly, to a method for transmitting/receiving uplink data and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method for transmitting uplink data by a user equipment (UE). The method comprises: receiving resource configuration information including information on a first radio resource not dedicated to the UE; performing transmission of the uplink data using the first radio resource; and transmitting a request for radio resource dedicated to the UE for retransmission of the uplink data if the transmission of the uplink data using the first radio resource is not successful for a certain number of transmissions of the uplink data or for a certain period of time.

In another aspect of the present invention, provided herein is a method for receiving uplink data by a base station (BS).

The method comprises: transmitting resource configuration information including information on a first radio resource not dedicated to a user equipment (UE); attempting to receive uplink data of the UE using the first radio resource; and receiving a request for a radio resource dedicated to the UE for retransmission of uplink data of the UE from the UE.

In a further aspect of the present invention, provided herein is a user equipment (UE) for transmitting uplink data. The UE comprises a transceiver, and a processor configured to control the transceiver. The processor is configured to: control the transceiver to receive resource configuration information including information on a first radio resource not dedicated to the UE; control the transceiver to perform transmission of the uplink data using the first radio resource; and control the transceiver to transmit a request for radio resource dedicated to the UE for retransmission of the uplink data if the transmission of the uplink data using the first radio resource is not successful for a certain number of transmissions of the uplink data or for a certain period of time.

In a still further aspect of the present invention, provided herein is a base station (BS) for receiving uplink data. The BS comprises a transceiver, and a processor configured to control the transceiver. The processor is configured to: control the transceiver to transmit resource configuration information including information on a first radio resource not dedicated to a user equipment (UE); attempt to receive uplink data of the UE using the first radio resource; and control the transceiver to receive a request for a radio resource dedicated to the UE for retransmission of uplink data of the UE from the UE.

In each aspect of the present invention, resource information on a second radio resource dedicated to the UE may be provided to the UE by the BS. The UE may perform retransmission of the uplink data using the second radio resource. The BS may receive retransmission of the uplink data using the second radio resource.

In each aspect of the present invention, the resource configuration information may include information on the certain number or the certain period.

In each aspect of the present invention, the transmission of the uplink data may be considered not successful if an acknowledgement for the uplink data is not received by the UE, or if information on a radio resource dedicated to the UE for the retransmission of the uplink data or new transmission of another uplink data is not received by the UE.

In each aspect of the present invention, the request may include at least an identity of a HARQ process used for the transmission of the uplink data, an identity of the UE, or information on an amount of data to be transmitted.

In each aspect of the present invention, the UE may not transmit the uplink data using the first radio resource if the request is transmitted.

In each aspect of the present invention, the UE may maintain a HARQ buffer of a HARQ process used for the transmission of the uplink data even if the transmission of the uplink data using the first radio resource is not successful for the certain number of transmissions of the uplink data or for the certain period of time.

In each aspect of the present invention, the UE may initialize a redundancy version of a HARQ process used for the transmission of the uplink data if the request is transmitted.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to an embodiment of the present invention, delay/latency occurring during communication between a user equipment and a BS may be reduced.

Also, signals in a new radio access technology system can be transmitted/received effectively.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
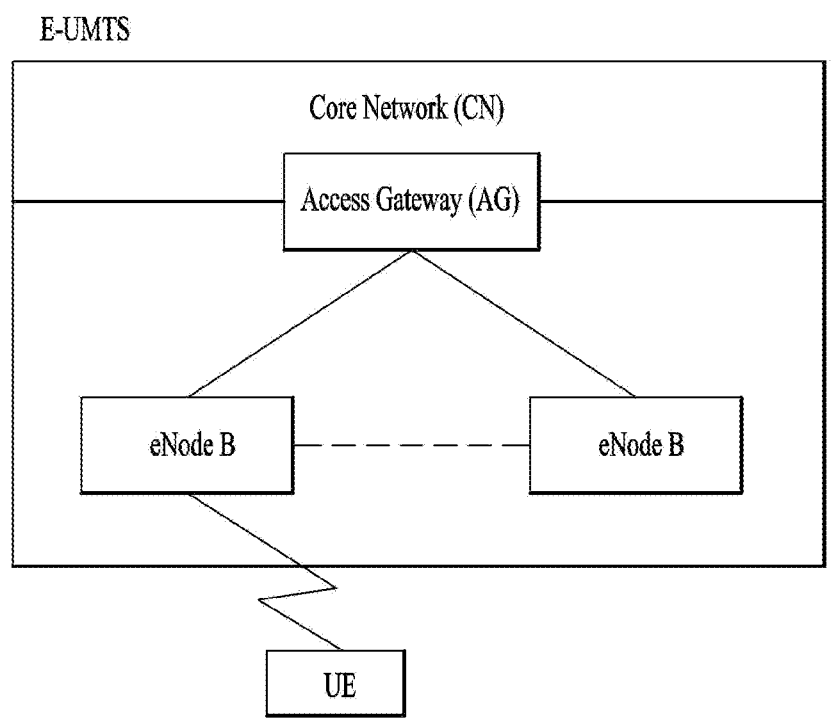
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based wireless communication system. However, the technical features of the present invention are not limited thereto. For example, although the following detailed description is given based on a mobile communication system corresponding to a 3GPP based system, aspects of the present invention that are not limited to 3GPP based system are applicable to other mobile communication systems.

For example, the present invention is applicable to contention based communication such as Wi-Fi as well as non-contention based communication as in the 3GPP based system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is often referred to as a NB, a BS of the EPC/LTE is often referred to as an eNB, and a BS of the new radio (NR) system is often referred to as a gNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP based system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the recent 3GPP based wireless communication standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, an EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, monitoring a channel implies attempting to decode the channel. For example, monitoring a PDCCH implies attempting to decode PDCCH(s) (or PDCCH candidates).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331, and 3GPP NR standard documents, for example, 3GPP TS 38.211, 3GPP TS 38.213, 3GPP TS 38.214, 3GPP TS 38.300, 3GPP TS 38.321, 3GPP TS 38.322, 3GPP TS 38.323 and 3GPP TS 38.331 may be referenced.

Figure 2:
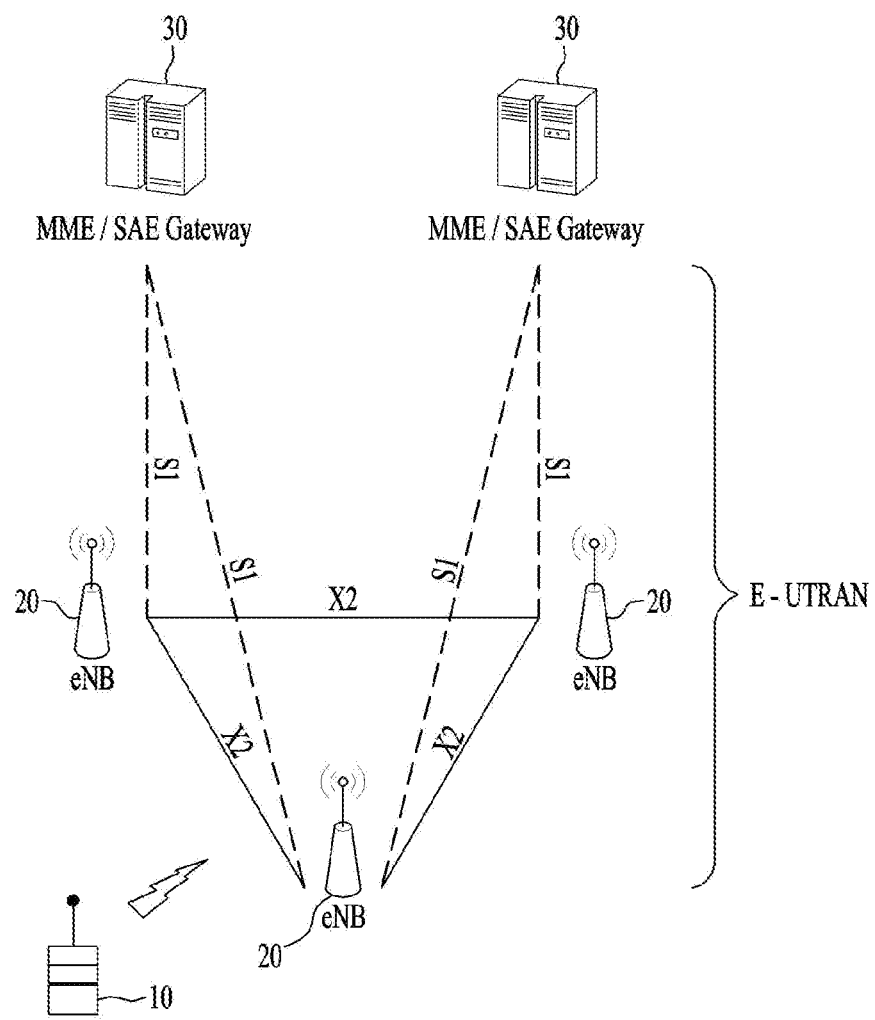
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
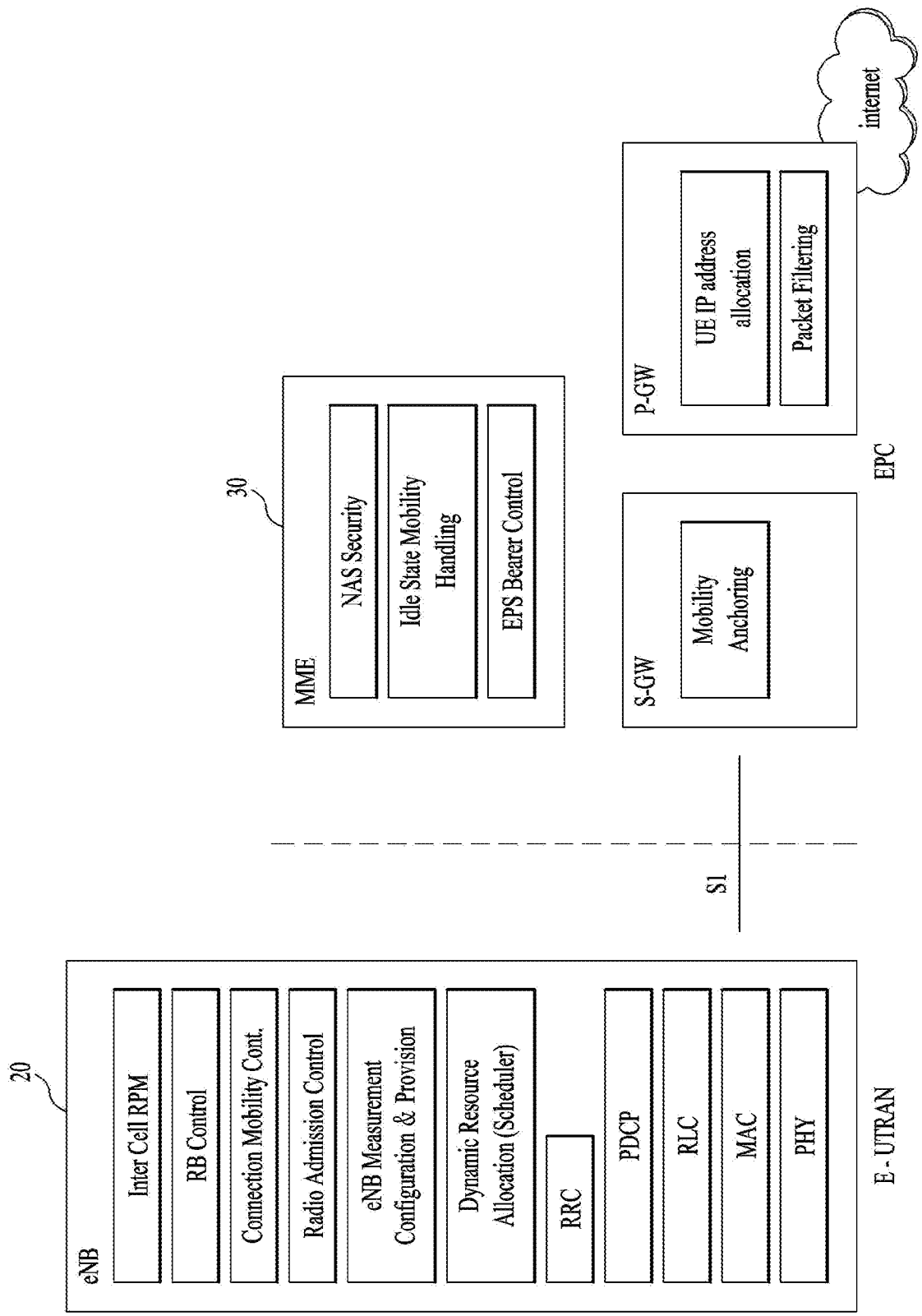
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
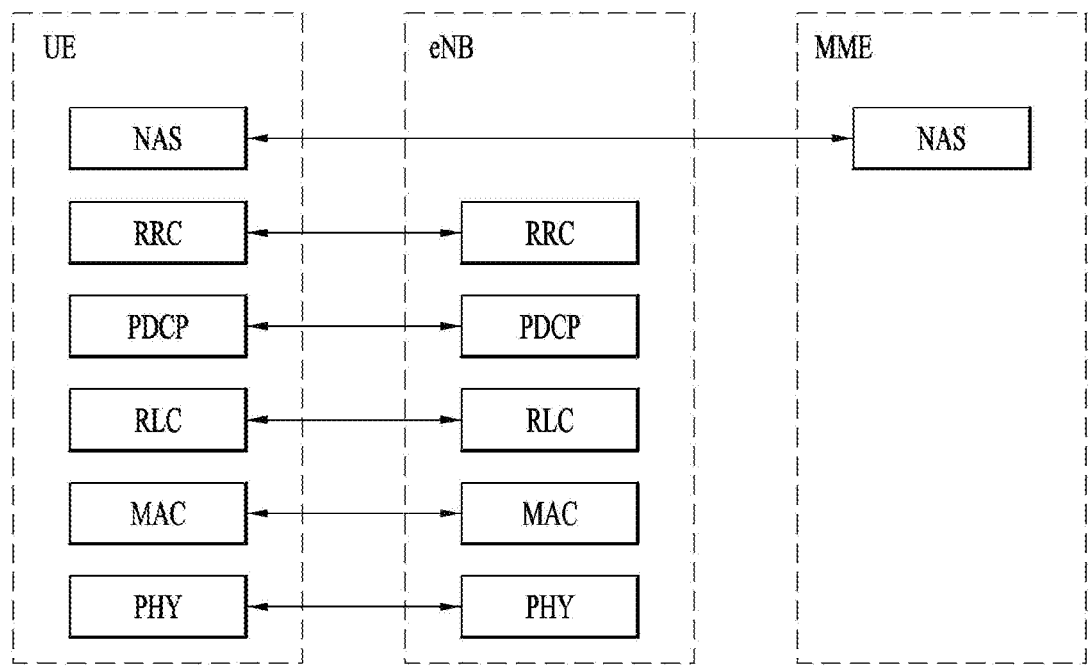
FIG. 4 is a diagram showing a control plane and a user plane of a radio interface protocol between a UE and an E-UTRAN based on a 3GPP radio access network standard.
Figure 4:
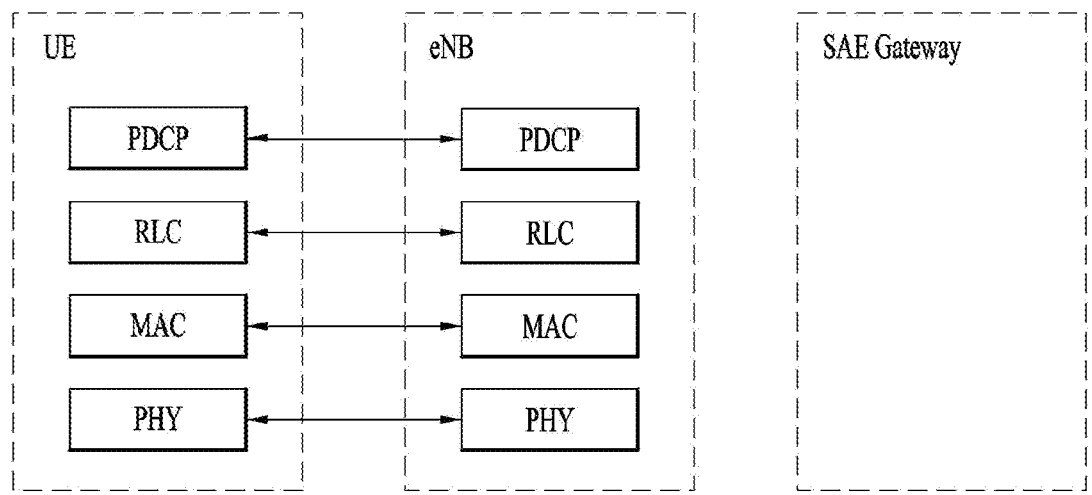

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the 3GPP LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

The main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ; priority handling between logical channels of one UE; priority handling between UEs by means of dynamic scheduling; MBMS service identification; transport format selection; and padding.

The main services and functions of the RLC sublayer include: transfer of upper layer protocol data units (PDUs); error correction through ARQ (only for acknowledged mode (AM) data transfer); concatenation, segmentation and reassembly of RLC service data units (SDUs) (only for unacknowledged mode (UM) and acknowledged mode (AM) data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment, except for a NB-IoT UE that only uses Control Plane CIoT EPS optimizations. Radio Bearers are not characterized by a fixed sized data unit (e.g. a fixed sized RLC PDU).

The main services and functions of the PDCP sublayer for the user plane include: header compression and decompression: ROHC only; transfer of user data; in-sequence delivery of upper layer PDUs at PDCP re-establishment procedure for RLC AM; for split bearers in DC and LWA bearers (only support for RLC AM): PDCP PDU routing for transmission and PDCP PDU reordering for reception; duplicate detection of lower layer SDUs at PDCP re-establishment procedure for RLC AM; retransmission of PDCP SDUs at handover and, for split bearers in DC and LWA bearers, of PDCP PDUs at PDCP data-recovery procedure, for RLC AM; ciphering and deciphering; timer-based SDU discard in uplink. The main services and functions of the PDCP for the control plane include: ciphering and integrity protection; and transfer of control plane data. For split and LWA bearers, PDCP supports routing and reordering. For DRBs mapped on RLC AM and for LWA bearers, the PDCP entity uses the reordering function when the PDCP entity is associated with two AM RLC entities, when the PDCP entity is configured for a LWA bearer; or when the PDCP entity is associated with one AM RLC entity after it was, according to the most recent reconfiguration, associated with two AM RLC entities or configured for a LWA bearer without performing PDCP re-establishment.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
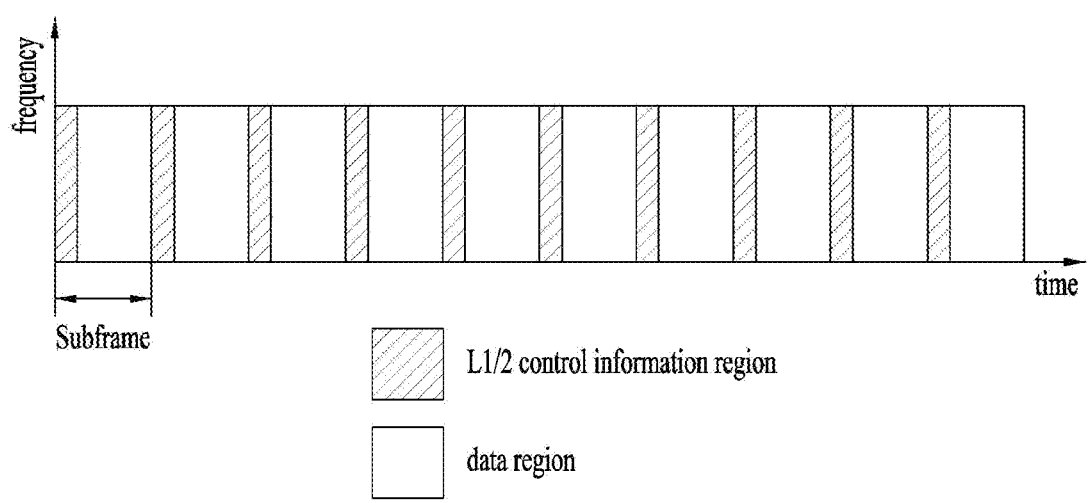
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the 3GPP LTE/LTE-A system, an opportunity of transmission of an UL grant or a DL grant is present every 1 ms, and the UL/DL grant opportunity does not exists several times in less than 1 ms. Therefore, the TTI in the legacy 3GPP LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information. In the present invention, a PDCCH addressed to a certain RNTI means that the PDCCH is CRC-masked with the certain RNTI. A UE may attempt to decode a PDCCH using the certain RNTI if the UE is monitoring a PDCCH addressed to the certain RNTI.

In LTE, for the uplink, E-UTRAN can dynamically allocate resources (PRBs and MCS) to UEs at each TTI via the C-RNTI on PDCCH(s). A UE always monitors the PDCCH(s) in order to find possible allocation for uplink transmission when its downlink reception is enabled (activity governed by DRX when configured). When carrier aggregation is configured, the same C-RNTI applies to all serving cells. In addition, E-UTRAN can allocate a semi-persistent uplink resource for the first HARQ transmissions and potentially retransmissions to UEs:

RRC defines the periodicity of the semi-persistent uplink grant; and

PDCCH indicates whether the uplink grant is a semi-persistent one i.e. whether it can be implicitly reused in the following TTIs according to the periodicity defined by RRC.

In the subframes where the UE has semi-persistent uplink resource, if the UE cannot find its C-RNTI on the PDCCH (s), an uplink transmission according to the semi-persistent allocation that the UE has been assigned in the TTI can be made. The network performs decoding of the pre-defined PRBs according to the pre-defined MCS. Otherwise, in the subframes where the UE has semi-persistent uplink resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent uplink allocation, or explicitly allocated via PDCCH(s) in which case the UE does not follow the semi-persistent allocation. Similarly as for the downlink, semi-persistent uplink resources can only be configured for the PCell and only PDCCH allocations for the PCell can override the semi-persistent allocation. When DC is configured, semi-persistent uplink resources can only be configured for the PCell or PSCell. Only PDCCH allocations for the PCell can override the semi-persistent allocation for PCell and only PDCCH allocations for the PSCell can override the semi-persistent allocation for PSCell.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Building upon its success of IMT-2000 (3G) and IMT-Advanced (4G), 3GPP has been devoting its effort to IMT-2020 (5G) development since September 2015. 5G New Radio (NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC). eMBB is targeting high data rate mobile broadband services, such as seamless data access both indoors and outdoors, and AR/VR applications; URLLC is defined for applications that have stringent latency and reliability requirements, such as vehicular communications that can enable autonomous driving and control network in industrial plants; mMTC is the basis for connectivity in IoT, which allows for infrastructure management, environmental monitoring, and healthcare applications.

RAN WG1 at 3GPP has been approaching the physical layer design with eMBB services and verticals in mind. Wide bandwidth (e.g. 100 MHz below 6 GHz and up to 400 MHz for Millimeter Wave [high priority: 24.25 GHz~29.5 GHz]) is the basic method for achieving ultra-high data rates. Many other techniques, such as carrier aggregation, multiple or massive antenna, and Low-density parity-check (LDPC) coding, are also considered for data rate boosting (up to 20 Gbps). In a high-mobility scenario (e.g. high-speed train (HST) with velocity up to 500 km/h), a higher density of reference symbols (RS) would be flexibly configured for robustness against a faster time-varying channel. In terms of low latency, a smaller periodicity of the slot is preferred, and self-contained slot structure is agreed due to its fast ACK/NACK for data transmissions. Additionally, 5G NR hopes to support URLLC services and eMBB services simultaneously on one carrier. URLLC is implemented with a higher priority with guaranteed time-frequency resource by puncturing the eMBB services. To summarize, flexible design and configuration of the transmission modes and parameters are the core idea of 5G NR.

Figure 6:
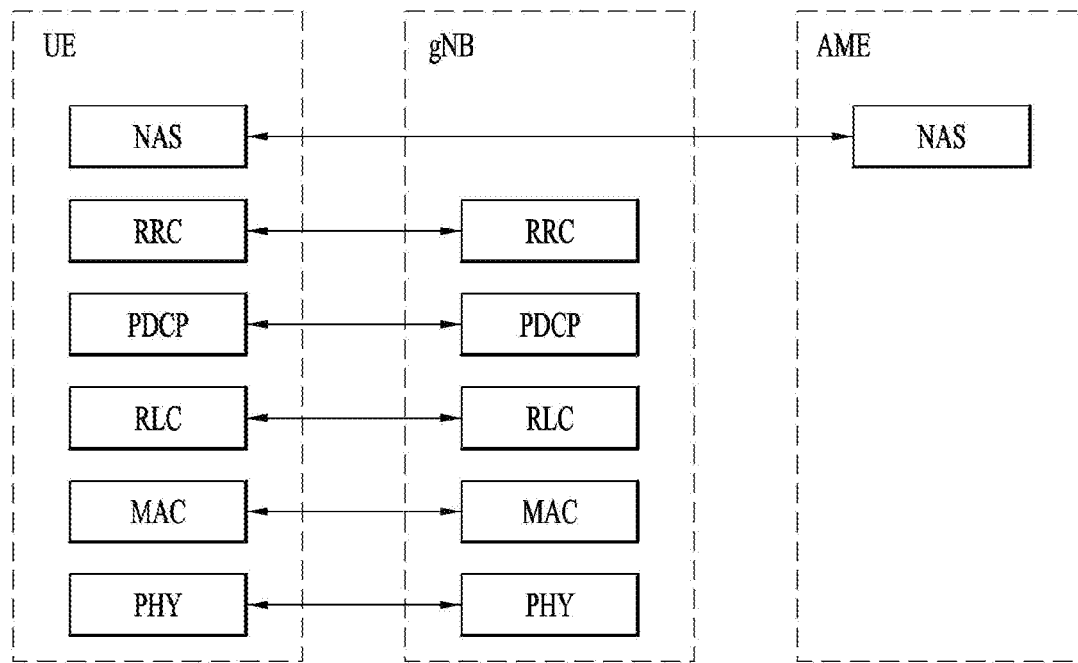
FIG. 6 shows examples of protocol stacks in the NR system.
Figure 6:
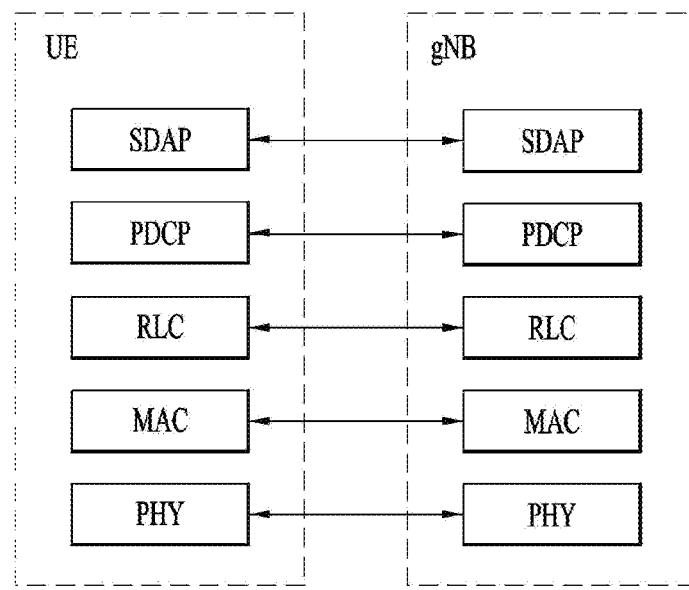

FIG. 6 shows examples of protocol stacks in the NR system. Especially, FIG. 6(a) shows the protocol stack for the user plane, and FIG. 6(b) shows the protocol stack for the control plane.

The overall protocol stack architecture for the NR system might be similar to that of the LTE/LTE-A system, but some functionalities of the protocol stacks of the LTE/LTE-A system should be modified in the NR system in order to resolve the weakness or drawback of LTE. RAN WG2 for NR is in charge of the radio interface architecture and protocols. The new functionalities of the control plane include the following: on-demand system information delivery to reduce energy consumption and mitigate interference, two-level (i.e. Radio Resource Control (RRC) and Medium Access Control (MAC)) mobility to implement seamless handover, beam based mobility management to accommodate high frequency, RRC inactive state to reduce state transition latency and improve UE battery life. The new functionalities of the user plane aim at latency reduction by optimizing existing functionalities, such as concatenation and reordering relocation, and RLC out of order delivery. In addition, a new user plane AS protocol layer named as Service Data Adaptation Protocol (SDAP) has been introduced to handle flow-based Quality of Service (QoS) framework in RAN, such as mapping between QoS flow and a data radio bearer, and QoS flow ID marking. Hereinafter the layer 2 according to the current agreements for NR is briefly discussed.

The layer 2 of NR is split into the following sublayers: Medium Access Control (MAC), Radio Link Control (RLC), Packet Data Convergence Protocol (PDCP) and Service Data Adaptation Protocol (SDAP). The physical layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers, and the SDAP sublayer offers to 5GC QoS flows. Radio bearers are categorized into two groups: data radio bearers (DRB) for user plane data and signalling radio bearers (SRB) for control plane data.

The main services and functions of the MAC sublayer of NR include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per carrier in case of carrier aggregation); priority handling between UEs by means of dynamic scheduling; priority handling between logical channels of one UE by means of logical channel prioritization; and padding. A single MAC entity can support one or multiple numerologies and/or transmission timings and mapping restrictions in logical channel prioritisation controls which numerology and/or transmission timing a logical channel can use. Each HARQ process is associated with a HARQ buffer. For synchronous HARQ, each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0. The sequence of redundancy versions is 0, 2, 3, 1. The variable CURRENT_IRV is an index into the sequence of redundancy versions. This variable is updated modulo 4. New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt. For synchronous HARQ, the MAC entity is configured with a maximum number of HARQ transmissions and a maximum number of Msg3 HARQ transmissions by RRC: maxHARQ-Tx and max-HARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx. When the HARQ feedback is received for this TB, the HARQ process shall: set HARQ_FEEDBACK to the received value. If the HARQ entity requests a new transmission, the HARQ process shall:
> if UL HARQ operation is synchronous:
>> set CURRENT_TX_NB to 0;
>> set HARQ_FEEDBACK to NACK;
>> set CURRENT_IRV to 0;
> else:
>> set CURRENT_IRV to the index corresponding to the redundancy version value provided in the HARQ information;
> store the MAC PDU in the associated HARQ buffer;
> store the uplink grant received from the HARQ entity;
> generate a transmission. If the HARQ entity requests a retransmission, the HARQ process shall:
> if UL HARQ operation is synchronous:
>> increment CURRENT_TX_NB by 1;
> if the HARQ entity requests an adaptive retransmission:
>> store the uplink grant received from the HARQ entity;
>> set CURRENT_IRV to the index corresponding to the redundancy version value provided in the HARQ information;
>> if UL HARQ operation is synchronous:
>>> set HARQ_FEEDBACK to NACK;
>> generate a transmission.
> else if the HARQ entity requests a non-adaptive retransmission:
>> if UL HARQ operation is asynchronous or HARQ_FEEDBACK=NACK:
>>> if both skipUplinkTxSPS and fixedRV-NonAdaptive are configured and the uplink grant of the initial transmission of this HARQ process was performed on a configured grant or
>>> if the uplink grant is a preallocated uplink grant:
>>>> set CURRENT_IRV to 0;
>>> generate a transmission. To generate a transmission, the HARQ process shall: instruct the physical layer to generate a transmission according to the stored uplink grant with the redundancy version corresponding to the CURRENT_IRV value; increment CURRENT_IRV by 1; if UL HARQ operation is synchronous and there is a measurement gap or Sidelink Discovery Gap for Reception at the time of the HARQ feedback reception for this transmission and if the MAC PDU was not obtained from the Msg3 buffer: set HARQ_FEEDBACK to ACK at the time of the HARQ feedback reception for this transmission.

The RLC sublayer of NR supports three transmission modes: Transparent Mode (TM); Unacknowledged Mode (UM); Acknowledged Mode (AM). The RLC configuration is per logical channel with no dependency on numerologies and/or TTI durations, and ARQ can operate on any of the numerologies and/or TTI durations the logical channel is configured with. For SRB0, paging and broadcast system information, TM mode is used. For other SRBs AM mode used. For DRBs, either UM or AM mode are used. The main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; Reassembly of SDU (AM and UM); duplicate detection (AM only); RLC SDU discard (AM and UM); RLC re-establishment; and protocol error detection (AM only). The ARQ within the RLC sublayer of NR has the following characteristics: ARQ retransmits RLC PDUs or RLC PDU segments based on RLC status reports; polling for RLC status report is used when needed by RLC; and RLC receiver can also trigger RLC status report after detecting a missing RLC PDU or RLC PDU segment.

The main services and functions of the PDCP sublayer of NR for the user plane include: sequence numbering; header compression and decompression: ROHC only; transfer of user data; reordering and duplicate detection; PDCP PDU routing (in case of split bearers); retransmission of PDCP SDUs; ciphering, deciphering and integrity protection; PDCP SDU discard; PDCP re-establishment and data recovery for RLC AM; and duplication of PDCP PDUs. The main services and functions of the PDCP sublayer of NR for the control plane include: sequence numbering; ciphering, deciphering and integrity protection; transfer of control plane data; reordering and duplicate detection; and duplication of PDCP PDUs.

The main services and functions of SDAP include: mapping between a QoS flow and a data radio bearer; marking QoS flow ID (QFI) in both DL and UL packets. A single protocol entity of SDAP is configured for each individual PDU session. Compared to LTE's QoS framework, which is bearer-based, the 5G system adopts the QoS flow-based framework. The QoS flow-based framework enables flexible mapping of QoS flow to DRB by decoupling QoS flow and the radio bearer, allowing more flexible QoS characteristic configuration.

Figure 7:
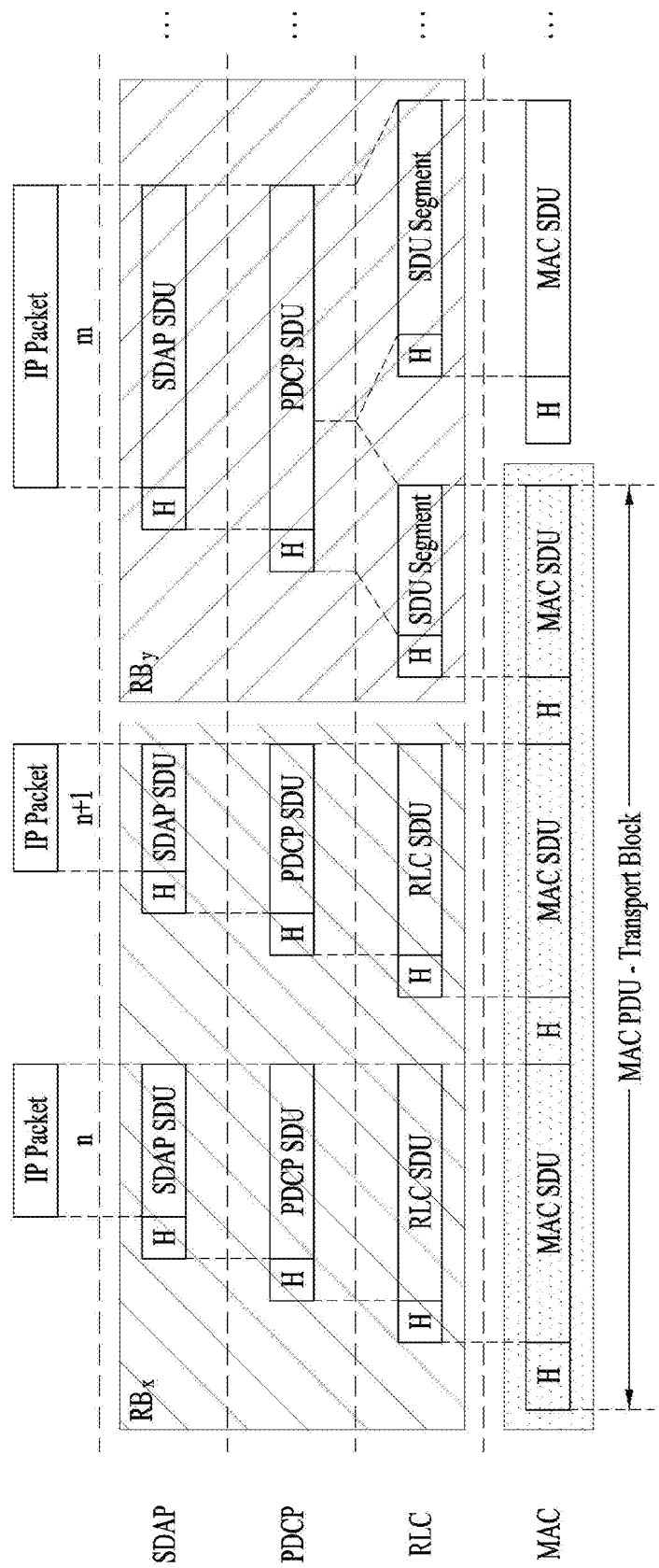
FIG. 7 illustrates a data flow example at a transmitting device in the NR system.

FIG. 7 illustrates a data flow example at a transmitting device in the NR system.

In FIG. 7, an RB denotes a radio bearer. Referring to FIG. 7, a transport block is generated by MAC by concatenating two RLC PDUs from $RB_x$ and one RLC PDU from $RB_y$. The two RLC PDUs from $RB_x$ each corresponds to one IP packet (n and n+1) while the RLC PDU from $RB_y$ is a segment of an IP packet (m). In NR, a RLC SDU segment can be located in the beginning part of a MAC PDU and/or in the ending part of the MAC PDU.

In NR, contention based data transmission can be used, where a radio resource is shared by multiple UEs. The radio resource shared by multiple UEs is different from a radio resource allocated by semi-persistent scheduling (SPS) of LTE, in that the radio resource by SPS is not for the contention based data transmission but for the contention free data transmission. Besides, in case of semi-persistently scheduled resources, a UE may perform retransmission of uplink data using any available uplink grant existing at the HARQ timing for the uplink data, even if a semi-persistently scheduled resource was used for the previous transmission of the uplink data. On the other hand, in case of shared radio resources, as a UE would use a shared radio resource when there is no uplink grant dedicated to the UE, the UE should perform retransmission of uplink data using a shared radio resource if the previous transmission of the uplink data using a shared radio resource is not successful.

The probability of transmission collision on a radio resource becomes higher as more UEs share the same radio resource, while the resource efficiency becomes worse if less UEs share the radio resource. As the network can hardly predict the exact number of UEs having data to transmit simultaneously, one reasonable way assigning resources (i.e., shared radio resource(s)) for contention based data transmission would be to assign the shared radio resource(s) by assuming that a certain portion of UEs would have data to transmit at the same time. In other words, the network provides the shared radio resource for multiple UEs but assumes that not all the UEs will have data to transmit at the same time. However, there could be a case that more UEs than the certain portion of UEs try to transmit data by using the shared radio resource simultaneously. In this case, even if a UE changes the resources among the shared radio resources for retransmission, it may not be possible to avoid collision because too many UEs are trying to transmit data within the limited amount of shared radio resource. In this case, the network may not be able to identify the collided UEs, and then the network may not be able to provide any dedicated radio resource for the collided UEs. Accordingly, the UE may continuously fail to transmit data using the shared radio resource. This would lead to undesirable latency or loss of data transmission.

Figure 8:
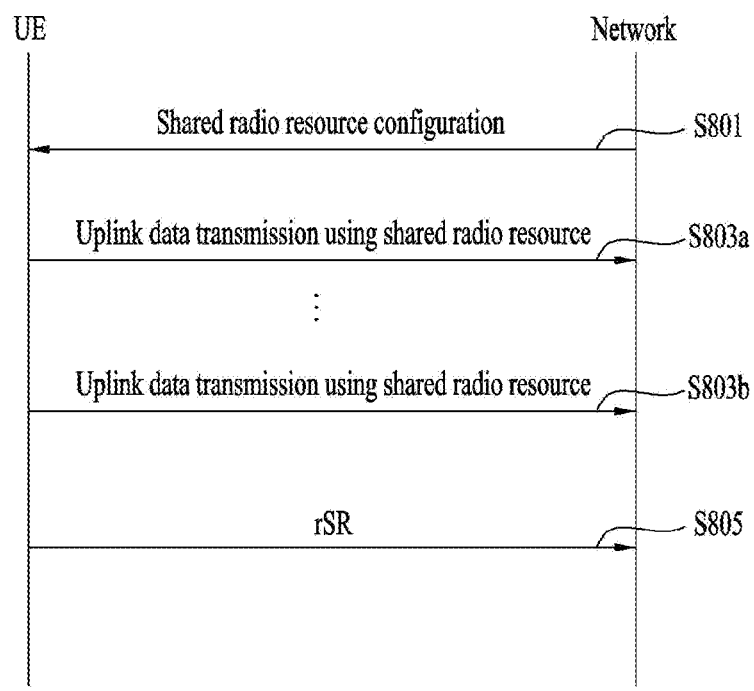
FIG. 8 illustrates an example of uplink data transmission according to the present invention.

FIG. 8 illustrates an example of uplink data transmission according to the present invention.

In the present invention, a UE requests an uplink resource for retransmission of data to a network if the UE continuously fails transmission of the data using a shared radio resource. In detail, in the present invention, the UE is configured with a condition when the UE triggers the scheduling request for retransmission (hereinafter referred to as rSR), if the UE is configured with the shared radio resource. When the condition is met, the UE triggers the rSR and sends the rSR to the network. In response to the rSR, the network (e.g. BS) allocates an uplink resource for retransmission to the UE, and transmits resource allocation information indicating the uplink resource to the UE. In other words, in response to the rSR, the UE receives the uplink resource for retransmission of the data from the network, and performs the retransmission of the data by using the uplink resource.

In the present invention, a UE is configured with a shared radio resource by a network (S801). The shared radio resource refers to a radio resource that is shared by at least two UEs. The network may configure with the UE with the shared radio resource by transmitting shared radio resource configuration information. The UE receives the shared radio resource configuration information from the network. The shared radio resource configuration information may include shared radio resource information (e.g., time and/or frequency information of the shared radio resource), and/or a condition to trigger an SR for retransmission (i.e., rSR).

In the present invention, the condition to trigger the rSR may be at least one of the followings:
the UE does not successfully transmit data using the shared radio resource consecutively for a certain number of times, where the certain number (e.g., an integer value) is pre-defined or configured by the network; or
the UE does not successfully transmit data using the shared radio resource consecutively for a certain period of time, where the certain period of time (e.g., in units of milliseconds, or subframes) is pre-defined or configured by the network.

In the present invention, a UE may consider that the UE does not successfully transmit data using the shared radio resource if the UE does not receive an ACK feedback for the data. Or, a UE may consider that the UE does not successfully transmit data using the shared radio resource if the UE does not receive an ACK feedback for the data if the UE receives a NACK feedback for the data.

Shared radio resource on a cell may be allocated for potential uplink data transmission by a network since the network does not know when uplink data transmission(s) occur on the cell. In this case, if uplink data transmission using the shared radio resource by a UE is successful, then the network may allocate a dedicated radio resource to the UE. Accordingly, in the present invention, a UE may consider that the UE does not successfully transmit data using the shared radio resource if the UE does not receive a dedicated radio resource for retransmission of the data or new transmission of another data in response to the transmission of the data.

When the condition is met (S803*a*, S803*b*), the UE triggers the rSR and generates the rSR. The rSR may include an identity of the HARQ process/entity used for the data transmission; an identity of the UE; and/or an amount of data to be retransmitted. For example, the amount of data to be retransmitted may be the size of the transport block (TB) including the data, or the size of total TBs for all of on-going data transmission(s) using the shared radio resource. In the present invention, the rSR may be transmitted by using Layer 2 signalling, for example, MAC control element.

When the condition is met, the UE may:
stop transmission of the data by using the shared radio resource. When the condition is met, the UE may keep a HARQ buffer for the transmission of the data (i.e., the UE does not flush the HARQ buffer of the HARQ process for the transmission of the data;
initialize a redundancy version of the HARQ process for the transmission of the data (i.e., the UE sets the redundancy version of the HARQ process for the data transmission to zero) because the network would not know the current redundancy version of uplink data of which transmission is not successful;
stop transmission of other data by using the shared radio resource, if any; and/or
consider that the shared radio resource is not valid resource (i.e., the UE considers that there is no shared radio resource which can be used for a data transmission).

The UE transmits the generated rSR to the network (S805). If the network receives the rSR from the UE, the network may provide the UE with an uplink radio resource dedicated to the UE which is to be used for the data retransmission. The dedicated uplink radio resource is for the retransmission of the data stored in the HARQ buffer of the HARQ process which is indicated via rSR. In the present invention, a dedicated radio resource refers to a radio resource that is not shared by any other UE but is dedicated to a UE. If the network receives the rSR, the network may release the shared radio resource from the UE. The network may release the shared radio resource from the UE by transmitting a release message to the UE. The network may consider that the shared radio resource is released from the UE if the network receives the rSR or if the network transmits resource allocation information of the dedicated uplink radio resource to the UE.

If the UE receives the uplink resource for retransmission of the data (i.e., if the UE receives resource allocation information of the uplink resource), the UE may perform retransmission of the data by using the received uplink resource.

Figure 9:
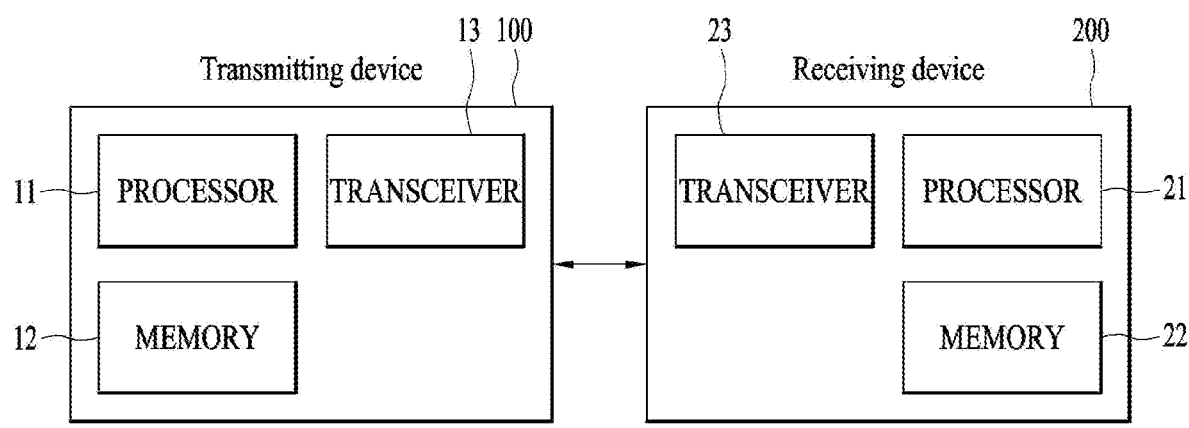
FIG. 9 is a block diagram illustrating elements of a transmitting device 100 and a receiving device 200 for implementing the present invention.

FIG. 9 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the transceivers 13 and 23 and the memories 12 and 22 to control the elements and configured to control the memories 12 and 22 and/or the transceivers 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the transceiver 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transceiver 13 may include an oscillator. The transceiver 13 may include $N_t$ (where $N_t$ is a positive integer) transmit antennas.

A signal processing process of the receiving device 200 is the reverse of the signal processing process of the transmitting device 100. Under control of the processor 21, the transceiver 23 of the receiving device 200 receives radio signals transmitted by the transmitting device 100. The transceiver 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The transceivers 13 and 23 include one or more antennas. An antenna performs a function for transmitting signals processed by the transceivers 13 and 23 to the exterior or receiving radio signals from the exterior to transfer the radio signals to the transceivers 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. A transceiver supporting a MIMO function of transmitting and receiving data using a plurality of antennas may be connected to two or more antennas. The transceivers 13 and 23 may be referred to as radio frequency (RF) units.

In the embodiments of the present invention, a UE operates as the transmitting device 100 in UL and as the receiving device 200 in DL. In the embodiments of the present invention, a gNB operates as the receiving device 200 in UL and as the transmitting device 100 in DL. Hereinafter, a processor, a transceiver, and a memory included in the UE will be referred to as a UE processor, a UE transceiver, and a UE memory, respectively, and a processor, a transceiver, and a memory included in the gNB will be referred to as a gNB processor, a gNB transceiver, and a gNB memory, respectively.

The UE processor can be configured to operate according to the present invention, or control the UE transceiver to receive or transmit signals according to the present invention. The gNB processor can be configured to operate according to the present invention, or control the gNB transceiver to receive or transmit signals according to the present invention.

A gNB processor may control a gNB transceiver to transmit resource configuration information including information on a first radio resource not dedicated to a UE. The resource configuration information may include information on the certain number or the certain period.

A UE transceiver receives the resource configuration information, and provides it to a UE processor. The UE processor may control the UE transceiver to receive resource configuration information including information on a first radio resource not dedicated to the UE. The UE processor may control the UE transceiver to perform transmission of the uplink data using the first radio resource, and control the UE transceiver to transmit a request for radio resource dedicated to the UE for retransmission of the uplink data if the transmission of the uplink data using the first radio resource is not successful for a certain number of transmissions of the uplink data or for a certain period of time. The UE processor may consider that the transmission of the uplink data is not successful if an acknowledgement for the uplink data is not received, or if information on a radio resource dedicated to the UE for the retransmission of the uplink data or new transmission of another uplink data is not received. The UE processor may generate the request to include at least an identity of a HARQ process used for the transmission of the uplink data, an identity of the UE, or information on an amount of data to be transmitted. The ue processor may not control the UE transceiver to transmit the uplink data using the first radio resource if the request is transmitted. The UE processor may maintain a HARQ buffer of a HARQ process used for the transmission of the uplink data even if the transmission of the uplink data using the first radio resource is not successful for the certain number of transmissions of the uplink data or for the certain period of time. The UE may initialize a redundancy version of a HARQ process used for the transmission of the uplink data if the request is transmitted.

The UE processor may control the UE transceiver to receive resource information on a second radio resource dedicated to the UE, and control the UE transceiver perform retransmission of the uplink data using the second radio resource.

The gNB processor may attempt to receive uplink data of a UE using the first radio resource. If the gNB transceiver receives a request for a radio resource dedicated to the UE for retransmission of uplink data of the UE from the UE, then the gNB processor may allocate a second radio resource dedicated to the UE which transmitted the rSR. The gNB processor may control the gNB transceiver to transmit resource information on the second radio resource dedicated to the UE, and control the gNB transmitter to uplink data of the UE using the second radio resource.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

What is claimed is:

1. A method for transmitting uplink data by a user equipment (UE), the method comprising:
   receiving resource configuration regarding a first radio resource not dedicated to the UE;
   performing an n-th transmission of the uplink data using the first radio resource,
   where n is a positive integer;
   performing a (n+1)-th transmission of the uplink data using the first radio resource based on the n-th transmission of the uplink data using the first radio resource being not successful, where n+1 is not greater than a predetermined maximum number maxHARQ-Tx of transmissions; and
   based on a (maxHARQ-Tx)-th transmission of the uplink data using the first radio resource being performed and not successful:
      transmitting a request for radio resource dedicated to the UE for retransmission of the uplink data;
      maintaining the uplink data in a HARQ buffer of a HARQ process used for the uplink data; and
      initializing a redundancy version of the HARQ process used for the uplink data to zero,
   wherein the resource configuration includes information regarding the predetermined number, and
   wherein the redundancy version of the HARQ process used for the uplink data is set to zero for 1-st transmission of the uplink data using the first radio resource, and incremented by 1 for a transmission of the uplink data using the first radio resource.

2. The method according to claim 1, further comprising:
   receiving resource information regarding a second radio resource dedicated to the UE; and
   performing the retransmission of the uplink data using the second radio resource.

3. The method according to claim 1, further comprising:
   determining that the n-th transmission of the uplink data is not successful based on not receiving an acknowledgement for the n-th transmission of the uplink data is not received, or based on not receiving information regarding the radio resource dedicated to the UE for the retransmission of the uplink data or new transmission of another uplink data.

4. The method according to claim 1, wherein the request includes at least an identity of the HARQ process used for the uplink data, an identity of the UE, or information regarding an amount of the uplink data.

5. The method according to claim 1, wherein the UE does not transmit the uplink data using the first radio resource based on transmitting the request.

6. A user equipment (UE) for transmitting uplink data, the UE comprising:
   a transceiver;
   a processor; and
   a memory storing at least one program that causes the processor to perform operations comprising:
   receiving resource configuration regarding a first radio resource not dedicated to the UE;
   performing an n-th transmission of the uplink data using the first radio resource, where n is a positive integer;
   performing a (n+1)-th transmission of the uplink data using the first radio resource based on the n-th transmission of the uplink data using the first radio resource being not successful, where n+1 is not greater than a predetermined maximum number maxHARQ-Tx of transmissions; and
   based on a (maxHARQ-Tx)-th transmission of the uplink data using the first radio resource being performed and not successful:
      transmitting a request for radio resource dedicated to the UE for retransmission of the uplink data,
      maintaining the uplink data in a HARQ buffer of a HARQ process used for the uplink data, and
      initializing a redundancy version of the HARQ process used for the uplink data to zero;
   wherein the resource configuration includes information regarding the predetermined number, and
   wherein the redundancy version of the HARQ process used for the uplink data is set to zero for 1-st transmission of the uplink data using the first radio resource, and incremented by 1 for a transmission of the uplink data using the first radio resource.

7. The UE according to claim 6, wherein the operations further comprise:
   receiving resource information regarding a second radio resource dedicated to the UE; and performing the retransmission of the uplink data using the second radio resource.

8. The UE according to claim 6, wherein the operations further comprise:
determining that the n-th transmission of the uplink data is not successful, based on not receiving an acknowledgement for the n-th transmission of the uplink data, or based on not receiving information regarding the radio resource dedicated to the UE for the retransmission of the uplink data or new transmission of another uplink data.

9. The UE according to claim 6, wherein the request includes at least an identity of the HARQ process used for the uplink data, an identity of the UE, or information regarding an amount of the uplink data.

10. The UE according to claim 6, wherein the operations further comprise:
not transmitting the uplink data using the first radio resource based on transmitting the request.

* * * * *